US009450882B2

(12) United States Patent
Pearce

(10) Patent No.: US 9,450,882 B2
(45) Date of Patent: Sep. 20, 2016

(54) METHOD AND APPARATUS FOR SUPPORTING CALL ADMISSION CONTROL USING GRAPH ASSEMBLY AND FATE-SHARE IDENTIFIERS

(75) Inventor: Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 269 days.

(21) Appl. No.: 13/453,141

(22) Filed: Apr. 23, 2012

(65) Prior Publication Data

US 2013/0282893 A1 Oct. 24, 2013

(51) Int. Cl.
*G06F 15/173* (2006.01)
*H04L 12/911* (2013.01)
*G06Q 10/02* (2012.01)
*H04L 12/24* (2006.01)

(52) U.S. Cl.
CPC ............... *H04L 47/70* (2013.01); *G06Q 10/02* (2013.01); *G06Q 10/025* (2013.01); *H04L 41/12* (2013.01)

(58) Field of Classification Search
CPC ........... H04L 47/10; H04L 2012/5667; H04L 29/06027; H04L 29/06; H04L 12/18; H04L 45/02; H04L 47/70; H04L 41/12; G06Q 10/02; G06Q 10/10; G06Q 10/025; H04W 8/183; H04W 28/10; G06F 9/541
USPC .......... 370/229, 232, 328, 352, 395.52, 401, 370/255, 329, 395.1, 462; 455/432.1; 705/5; 709/205, 227, 226, 224, 206; 719/328; 714/15, 43
See application file for complete search history.

(56) References Cited

U.S. PATENT DOCUMENTS

| | | | |
|---|---|---|---|
| 5,933,810 A * | 8/1999 | Okawa ............................. 705/5 |
| 6,304,576 B1 | 10/2001 | Corley et al. |
| 6,513,108 B1 | 1/2003 | Kerr et al. |
| 6,598,077 B2 | 7/2003 | Primak et al. |
| 6,628,649 B1 | 9/2003 | Raj et al. |
| 6,711,166 B1 * | 3/2004 | Amir et al. ................ 370/395.1 |
| 6,775,231 B1 | 8/2004 | Baker et al. |
| 6,788,646 B1 | 9/2004 | Fodor et al. |
| 6,856,601 B1 | 2/2005 | Bell et al. |
| 7,035,202 B2 | 4/2006 | Callon |
| 7,106,756 B1 | 9/2006 | Donovan et al. |
| 7,143,168 B1 | 11/2006 | Dibiasio et al. |

(Continued)

OTHER PUBLICATIONS

Lábaj Ondrej, Exception violations in Voice over IP telephony, Sep. 10-12, 2008, 50th International Symposium, p. 553.*

(Continued)

*Primary Examiner* — Oleg Survillo
*Assistant Examiner* — Schquita Goodwin
(74) *Attorney, Agent, or Firm* — P. Su

(57) ABSTRACT

In one embodiment, a method includes obtaining a potential bandwidth deduction at a call agent, the call agent being associated with an intercluster call admission control (CAC) arrangement in which bandwidth is shared, the potential bandwidth deduction being associated with a session. The method also includes determining whether the potential bandwidth deduction is a duplicate bandwidth deduction, deducting the potential bandwidth deduction from a bandwidth bucket when it is determined that the potential bandwidth deduction is not the duplicate bandwidth deduction, and ignoring the potential bandwidth deduction when it is determined that the potential bandwidth deduction is the duplicate bandwidth deduction.

10 Claims, 12 Drawing Sheets

(56) References Cited

U.S. PATENT DOCUMENTS

| | | |
|---|---|---|
| 7,281,043 B1 | 10/2007 | Davie |
| 7,283,533 B1 * | 10/2007 | Kumar et al. ............ 370/395.52 |
| 7,453,801 B2 | 11/2008 | Taneja et al. |
| 7,536,192 B2 | 5/2009 | O'Neill |
| 7,764,605 B2 | 7/2010 | Wu et al. |
| 7,953,000 B2 | 5/2011 | Baker et al. |
| 2002/0131428 A1 * | 9/2002 | Pecus .................. H04L 12/1836 370/401 |
| 2002/0141345 A1 | 10/2002 | Szviatovszki et al. |
| 2003/0152029 A1 | 8/2003 | Couturier |
| 2003/0191828 A1 | 10/2003 | Ramanathan et al. |
| 2003/0223431 A1 | 12/2003 | Chavez et al. |
| 2004/0081104 A1 | 4/2004 | Pan et al. |
| 2004/0083287 A1 | 4/2004 | Gao et al. |
| 2004/0156313 A1 | 8/2004 | Hofmeister et al. |
| 2005/0078688 A1 | 4/2005 | Sharma et al. |
| 2005/0117512 A1 | 6/2005 | Vasseur et al. |
| 2006/0045132 A1 | 3/2006 | Metke |
| 2006/0056291 A1 * | 3/2006 | Baker et al. ................. 370/229 |
| 2006/0089988 A1 | 4/2006 | Davie et al. |
| 2006/0112400 A1 * | 5/2006 | Zhang et al. ................ 719/328 |
| 2007/0150602 A1 * | 6/2007 | Yared et al. ................. 709/227 |
| 2007/0286097 A1 * | 12/2007 | Davies ......................... 370/255 |
| 2008/0091781 A1 * | 4/2008 | Haruna et al. ............... 709/205 |
| 2008/0275956 A1 * | 11/2008 | Saxena ............ G06F 17/30368 709/206 |
| 2009/0172167 A1 * | 7/2009 | Drai et al. ................... 709/226 |
| 2009/0187795 A1 * | 7/2009 | Doverspike et al. ........... 714/43 |
| 2009/0296734 A1 * | 12/2009 | Nag ............................. 370/462 |
| 2010/0002687 A1 * | 1/2010 | Rosenberg .......... H04M 3/5232 370/352 |
| 2010/0064172 A1 * | 3/2010 | George et al. .................. 714/15 |
| 2010/0150337 A1 | 6/2010 | Chen et al. |
| 2011/0058473 A1 * | 3/2011 | Krym et al. .................. 370/232 |
| 2011/0207454 A1 * | 8/2011 | Garg et al. ................. 455/432.1 |
| 2012/0069837 A1 | 3/2012 | Pearce |
| 2012/0265874 A1 * | 10/2012 | Hoh ....................... G06Q 10/02 709/224 |
| 2013/0128825 A1 * | 5/2013 | Gallagher ..................... 370/329 |
| 2013/0138802 A1 * | 5/2013 | Fontenier ............ H04L 43/0817 709/224 |

OTHER PUBLICATIONS

Cisco Unified Communications Manager 8.0(1) Database Dictionary, Feb. 15, 2010, Cisco Systems, Inc. pp. 59-60.*

Kevin R Fall, "TCP/IP Illustrated, vol. 1 The Protocols Second Edition," Nov. 25, 2011, pp. 6-7 and 403-404.*

David D Clark, "The Design Philosophy of the DARPA Internet Protocols," Aug. 1988.*

Cisco, "What Are OSPF Areas and Virtual Links?" Dec. 18, 2005, pp. 1-2.*

* cited by examiner

METHOD AND APPARATUS FOR SUPPORTING CALL ADMISSION CONTROL USING GRAPH ASSEMBLY AND FATE-SHARE IDENTIFIERS

TECHNICAL FIELD

The disclosure relates generally to network communications. More particularly, the disclosure relates to a method and apparatus for efficiently accounting for shared bandwidth within a network, and for accurately assembling a topology within the network in which bandwidth is shared.

BACKGROUND

The Resource Reservation Protocol (RSVP) is a network control framework that enables source and destination endpoints to "reserve" resources, e.g., bandwidth, to establish a data flow between endpoints. The data flow may have a certain quality of service, class, priority, etc. Further, the data flow may involve any type of data including, but not limited to including, audio data, video data, and/or media data.

RSVP may operate in conjunction with routing protocols to reserve resources along a data path between source and destination endpoints. In certain situations, inconsistencies in a network may cause packets and flows to be disturbed or otherwise disrupted. Further, such inconsistencies are more prominent in times of congestion, where packets may be haphazardly dropped. For example, when a router falls behind and/or does not have sufficient bandwidth to handle all calls, packets may be discarded indiscriminately, thereby resulting in substantially all calls being compromised. In general, the ability to properly manage data sessions such as calls in a network environment presents a significant challenge to equipment vendors, service providers, and network operators.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
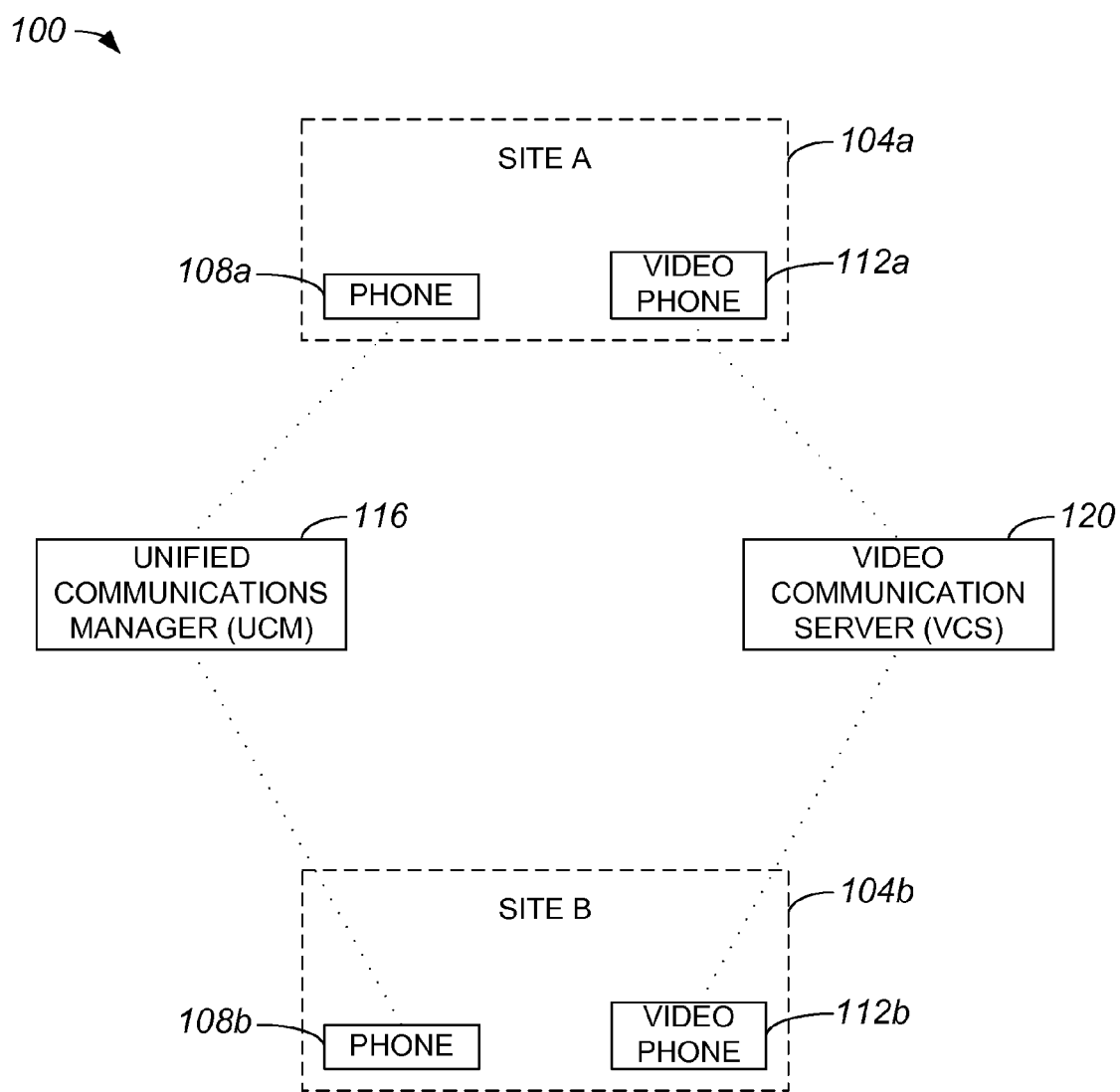
FIG. 1 is a diagrammatic representation of an intercluster Call Admission Control (CAC) arrangement.

According to one aspect, a method includes obtaining a potential bandwidth deduction at a call agent, the call agent being associated with an intercluster call admission control (CAC) arrangement in which bandwidth is shared, the potential bandwidth deduction being associated with a session. The method also includes determining whether the potential bandwidth deduction is a duplicate bandwidth deduction, deducting the potential bandwidth deduction from a bandwidth bucket when it is determined that the potential bandwidth deduction is not the duplicate bandwidth deduction, and ignoring the potential bandwidth deduction when it is determined that the potential bandwidth deduction is the duplicate bandwidth deduction. In one embodiment, the call agent is one selected from a group including a Unified Communications Manager (UCM), a UCSM having a back-to-back-user-agent (B2BUA), and a Video Communication Server (VCS).

DESCRIPTION

A Unified Communications Manager (UCM), e.g., a Cisco Unified Communications Manager (CUCM) available from Cisco Systems, Inc. of San Jose, Calif., may provide "locations" functionality that allows an enterprise to substantially maintain voice and video session quality when session media traverse limited bandwidth links. Sessions, e.g., calls, are generally counted as they are initiated, and the amount of bandwidth likely to be needed by the sessions may be estimated. Typically, when the number of sessions which are in progress exceeds the capacity of one of the links in an end-to-end path, a call agent may refuse to admit more sessions, e.g., calls, until the capacity of substantially all links is no longer exceeded.

By allowing a UCM such as a CUCM to model relatively complex networks, and by allowing a bandwidth accounting mechanism to operate with respect to multiple clusters and/or multiple call agents associated with a single site, the allocation of bandwidth for sessions may be performed efficiently substantially without a significant impact on the quality of the sessions. In one embodiment, a UCM may track bandwidth across clusters and may model relatively complex networks using network graphs. A system may permit an administrator to construct a graph-based model of a network that represents logical links over which media, e.g., rich media, may flow. It should be appreciated that rich media may include, but is not limited to including, video data and/or audio data such as voice data. An administrator may also set capacity values on edges and vertices on a model of a network that limit the number of sessions that may be established over calculated paths.

Locations, or sets of branch sites, within an enterprise may be assigned a bandwidth threshold for audio calls and for video calls. Within a location, bandwidth is generally assumed to be sufficient such that a substantially unlimited number of calls may be placed within the location. In other words, when two endpoints, e.g., phones, at a location attempt to call each other, a UCM will generally permit the call. However, when two endpoints are associated with different locations, the UCM may perform bandwidth accounting and deduct a projected bandwidth from a bandwidth bucket associated with a call originator call agent and a bandwidth bucket associated with a call terminator call agent. It should be appreciated that bandwidth buckets are associated with shared bandwidth, or bandwidth shared between clusters and/or call agents. When there is insufficient bandwidth at either the call originator call agent or the call terminator call agent, the UCM will generally not allow the call. It should be understood that while standard UCM may assume limited bandwidth within a site, a standard Video Communication Server (VCS) generally does not assume limited bandwidth used by calls within a site and/or calls that traverse the site.

A UCM may support a network topology model in which locations may be substantially connected via links into multi-tier topologies or, more generally, topologies that are more complex than hub-and-spoke topologies. A UCM may calculate a shortest path spanning tree to every possible destination endpoint or node for every source endpoint or node. In one embodiment, links may be assigned to bandwidth buckets that substantially define the capacity of the links for routing voice, video, or other traffic. As shortest paths have been calculated, a UCM generally may not need to deduct projected bandwidth for a call from an originator call agent to a destination call agent.

In a graph-based Call Admission Control (CAC) system, when a location has multiple egress routes, a call agent may account for end-to-end bandwidth availability along each link in a network model. When an endpoint associated with one call agent in an enterprise calls another endpoint managed by the same call agent, the call agent may apply appropriate bandwidth deductions to source to destination graph edges, and may also replicate the bandwidth deductions to substantially all call agents in the enterprise. When a call is placed between two endpoints managed by different call agents, the call agent associated with a call originator endpoint obtains information relating to the location of a call destination endpoint before admitting the call, and the call destination endpoint obtains information relating to the location of the call originator endpoint before admitting the call. Bandwidth deduction may occur when a call is successfully placed between endpoints managed by different call agents.

Substantially only one call agent may be needed to admit a call, and the call agent may not need knowledge relating to the location information of both an originator and a destination. However, when a call is rearranged essentially mid-call, both an originator and a destination may adjust a corresponding reservation. For example, when A calls B, a call agent for B may admit the call. If a feature connects B to D, however, both a call agent for B and a call agent for D may adjust the bandwidth for the call if an identifier, e.g., a fate-share identifier, is agreed upon.

FIG. 1 is a diagrammatic representation of an intercluster CAC arrangement. An intercluster CAC arrangement 100 includes a plurality of sites or locations 104a, 104b. Each site 104a, 104b may generally be managed by multiple call agents such as UCMs and/or VCSs. As shown, each site 104a, 104b may be managed by a UCM 116 and a VCS 120. It should be appreciated that a call agent 116, 120 generally tracks bandwidth across links, and calculates shortest paths between nodes, e.g., endpoints such as endpoints 108a, 108b and/or endpoints 112a, 112b. Call agents 116, 120 may generally be provisioned with software that is configured to manage features on behalf of endpoints 108a, 108b, 112a, 112b associated with call agents 116, 120.

Endpoints 108a, 112a may be included in site 104a, while endpoints 108b, 112b may be included in site 104b. Endpoints 108a, 108b may be phones, while endpoints 112a, 112b may be video phones, although it should be appreciated that endpoints 108a, 108b, 112a, 112b may be any suitable endpoints that may support calls or, more generally, sessions. Endpoints 108a, 108b, 112a, 112b may generally include suitable devices used to initiate a communication, such as any type of computer, a personal digital assistant (PDA), a laptop or electronic notebook, a wireless access point, web browser, a residential gateway, a modem, a cellular telephone, an iPhone, an IP phone, iPad, or any other device, component, element, or object capable of initiating or facilitating voice, audio, video, media, or data exchanges within a network environment. Endpoints 108a, 108b, 112a, 112b may also be any device that seeks to initiate a communication on behalf of another entity or element, such as a program, a database, or any other component, device, element, or object capable of initiating an exchange within a network environment.

Link bandwidth, or bandwidth associated with links between sites 104a, 104b and call agents 116, 120, is often subdivided among agents. In one embodiment, the bandwidth capacity associated with intercluster CAC arrangement 100 may be sufficient to support one video call. Thus, when a voice call between endpoint 108a and endpoint 108b is placed by UCM 116, VCS 120 should not place a video call between endpoint 112a, 112b, as insufficient bandwidth exists to support both a voice call between endpoints 108a, 108b and a video call between endpoints 112a, 112b. In other words, if VCS 120 places a call while a different call is already placed by UCM 116, the call quality of both calls may be compromised. As such, to essentially preserve call quality, VCS 120 may be aware of when one call has been placed by UCM 116 and, therefore, determine that another call should not be permitted between endpoints 112a, 112b.

In one embodiment, each call agent 116, 120 may maintain a substantially full picture of the network of which call agents 116, 120 are a part. In another embodiment, each call agent 116, 120 may be aware of substantially only parts of the network they manage, as well as links to immediate neighbors. That is, while each call agent 116, 120 may be configured locally with substantially only a "slice" of an overall graph, call agents exchange their respective slices of the overall graph an each call agent 116, 120 may assemble obtained slices into a relatively full picture of an overall graph.

In some instances, one call agent 116 may be set up such that call agent 116 assembles one graph while call agent 120 may be set up such that call agent assembles another graph. It should be appreciated, however, that for a shared CAC that is graph-based, each call agent may benefit from having the same graph, or a substantially identical view of the graph. Such a graph may include vertices and edges used by a call in question.

Figure 2:
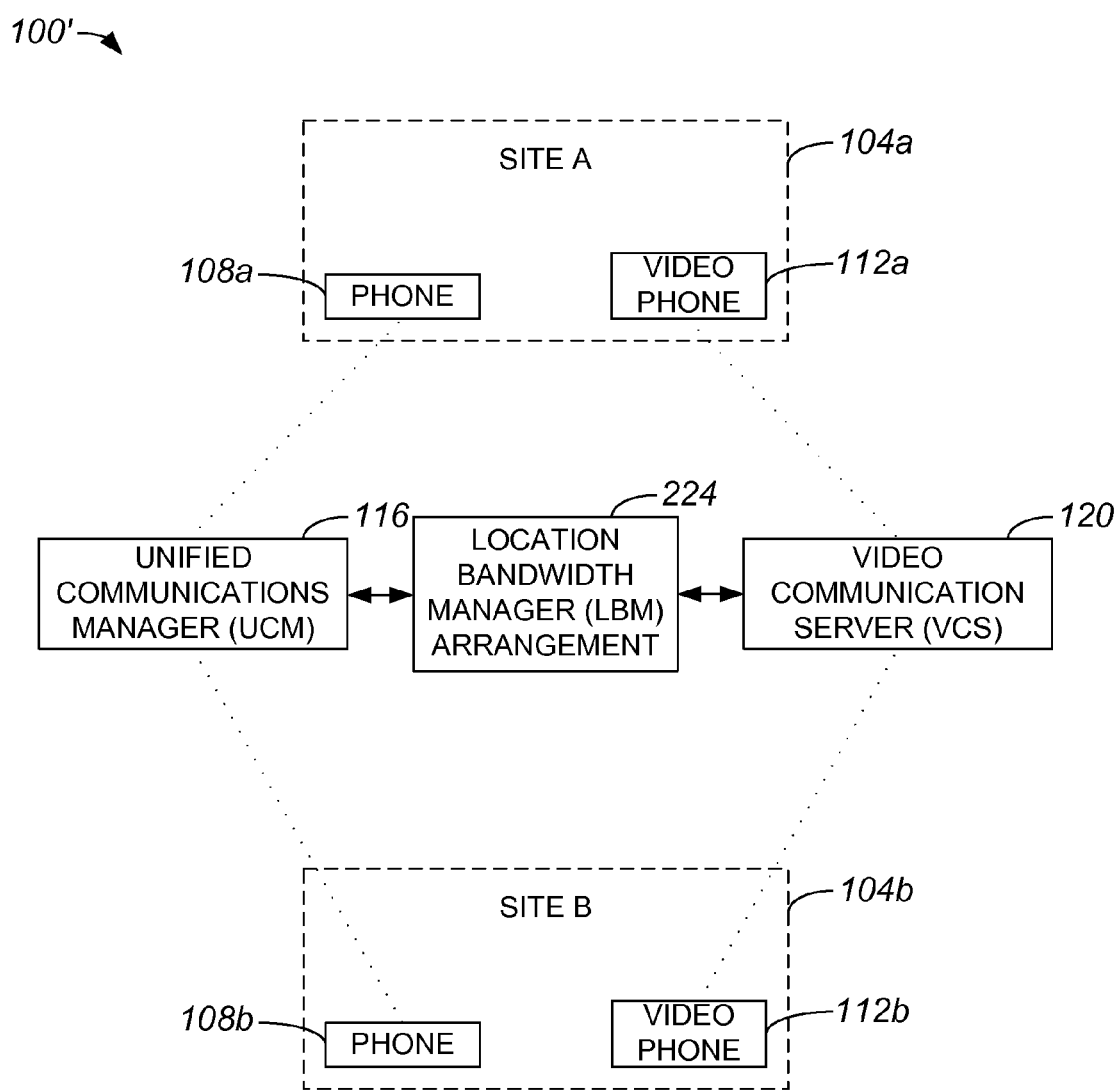
FIG. 2 is a diagrammatic representation of an intercluster CAC arrangement that includes a Location Bandwidth Manager (LBM) arrangement in accordance with an embodiment.

Effectively sharing a topology model and/or bandwidth accounting between call agents, e.g., call agents 116, 120 of FIG. 1, enables call agents and clusters, i.e., call agent clusters, to share bandwidth pools. In one embodiment, a Location Bandwidth Manager (LBM) effectively permits call agents and/or clusters within an intercluster CAC arrangement to share bandwidth pools. FIG. 2 is a diagrammatic representation of an intercluster CAC arrangement that includes an LBM arrangement that communicates with call agents, e.g., UCM 116 and VCS 120 of FIG. 1, in accordance with an embodiment. Within an intercluster CAC arrangement 100', call agents 116, 120 may communicate with an LBM arrangement 224. It should be appreciated that call agents 116, 120 may each be call agent clusters. In addition, LBM arrangement 224 may include any number of LBMs.

LBM arrangement 224 may serve as an internal locations server, and may interconnect any number of call agents 116, 120. Further, LBM arrangement 224 may be configured to support the communication of local views of a network between call agents 116, 120 such that a network topology or graph may be assembled.

When a call agent 116, 120 obtains a request to admit a call, LBM arrangement 224 determines whether the call may be admitted. If LBM arrangement 224 determines that a call may be admitted, LBM arrangement 224 may perform bandwidth deductions as appropriate, and inform call agents 116, 120 that the call may be admitted. In one embodiment, LBM arrangement 224 identifies whether it has been asked twice to support the same call, e.g., a call between site 104a and site 104b, and may permit bandwidth sharing when it is determined that the same call has been requested.

Figure 3:
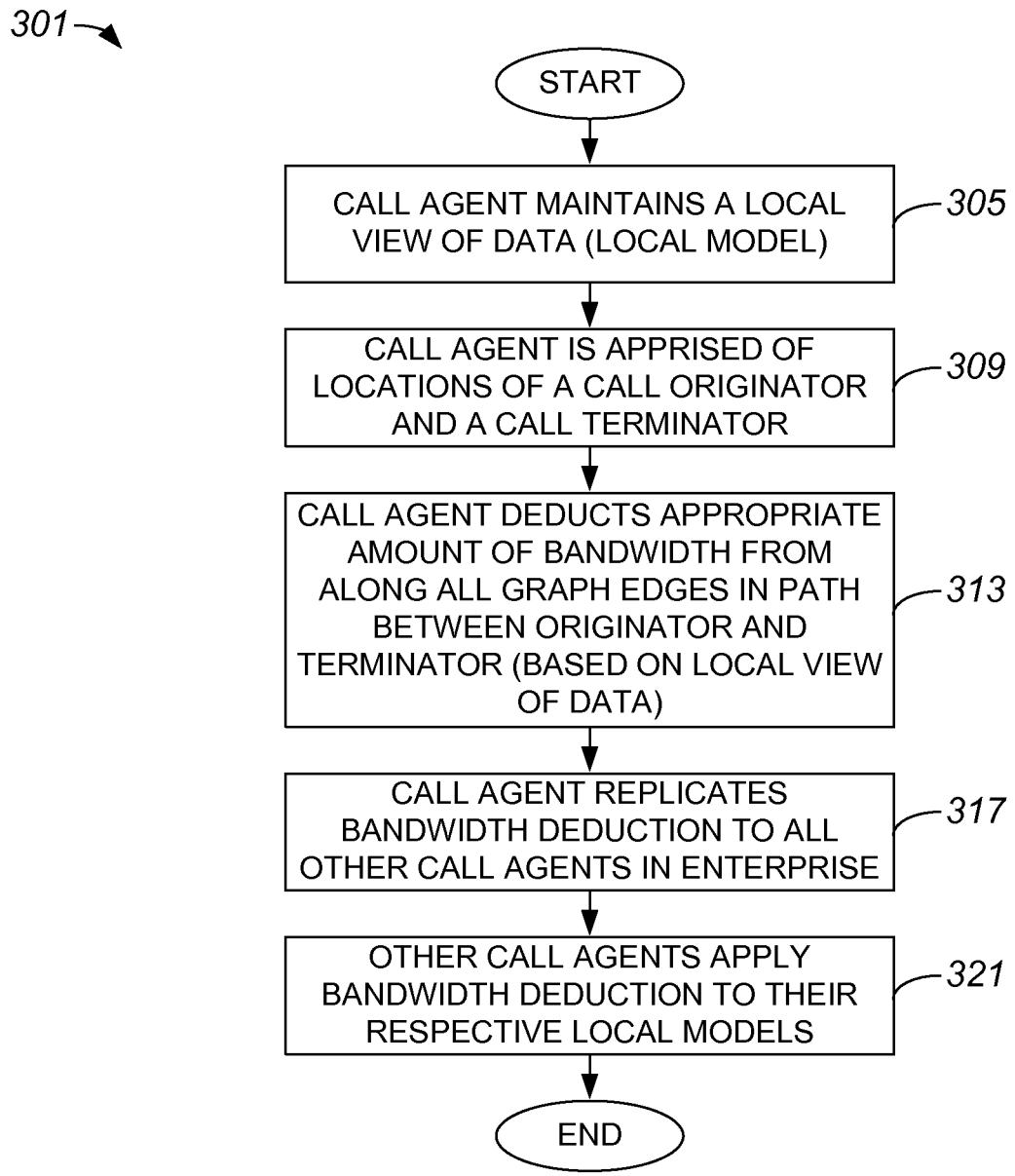
FIG. 3 is a process flow diagram which illustrates a method of communicating information regarding bandwidth within an intercluster CAC arrangement in accordance with an embodiment.

FIG. 3 is a process flow diagram which illustrates a method of communicating information regarding bandwidth within an intercluster CAC arrangement of a network in accordance with an embodiment. A method 301 of communicating bandwidth information within an enterprise that includes an intercluster CAC arrangement begins at step 305 in which a call agent maintains a local view of data, e.g., a local model. The call agent may be, but is not limited to being, a UCM or a VCS.

In step 309, the call agent is apprised of locations of a call originator, e.g., a caller, and a call terminator, e.g., a callee. That is, the call agent obtains information which indicates a location from which a call originates and a location from at which the call terminates. Once the call agent is apprised of locations of a call originator and a call terminator, the call agent may perform bandwidth deduction in step 313. Performing bandwidth deduction may include, but is not limited to including, deducting an appropriate amount of bandwidth from along substantially all graph edges in a path between the originator and the terminator. The bandwidth deduction may be performed based on a local view of data, e.g., a local model maintained by the call agent.

After the call agent performs the bandwidth deduction, the call agent may replicate the bandwidth deduction in step 317 to substantially all other call agents in the enterprise. The replication of the bandwidth deduction may generally include denoting locations between which a call is placed, calculating a modeled network path over which media is flowing, and accounting. In step 321, the other call agents in the enterprise may apply the bandwidth deduction to their respective models. Once the other call agents apply the bandwidth deduction to their respective models, the method of communicating information regarding bandwidth is completed.

When a call traverses multiple call agents, each call agent in a signaling path may attempt to perform a bandwidth deduction against a locally maintained topology model. Thus, in step 321 of FIG. 3, duplicate bandwidth deductions may occur, e.g., when an intermediate call agent that has already performed a local deduction processes a replicated deduction that the intermediate call agent has obtained. To effectively resolve duplicate transactions, intermediate call agents may be configured such that if an originator call agent of a call and a destination call agent of the call are both Internet Protocol (IP) trunks, the intermediate call agent will not perform any bandwidth deductions received from the originator call agent and the destination call agent. That is, a UCM will not perform a bandwidth deduction if a potential bandwidth deduction is associated with an originator call agent and a terminator call agent that are both IP trunks.

Figure 4:
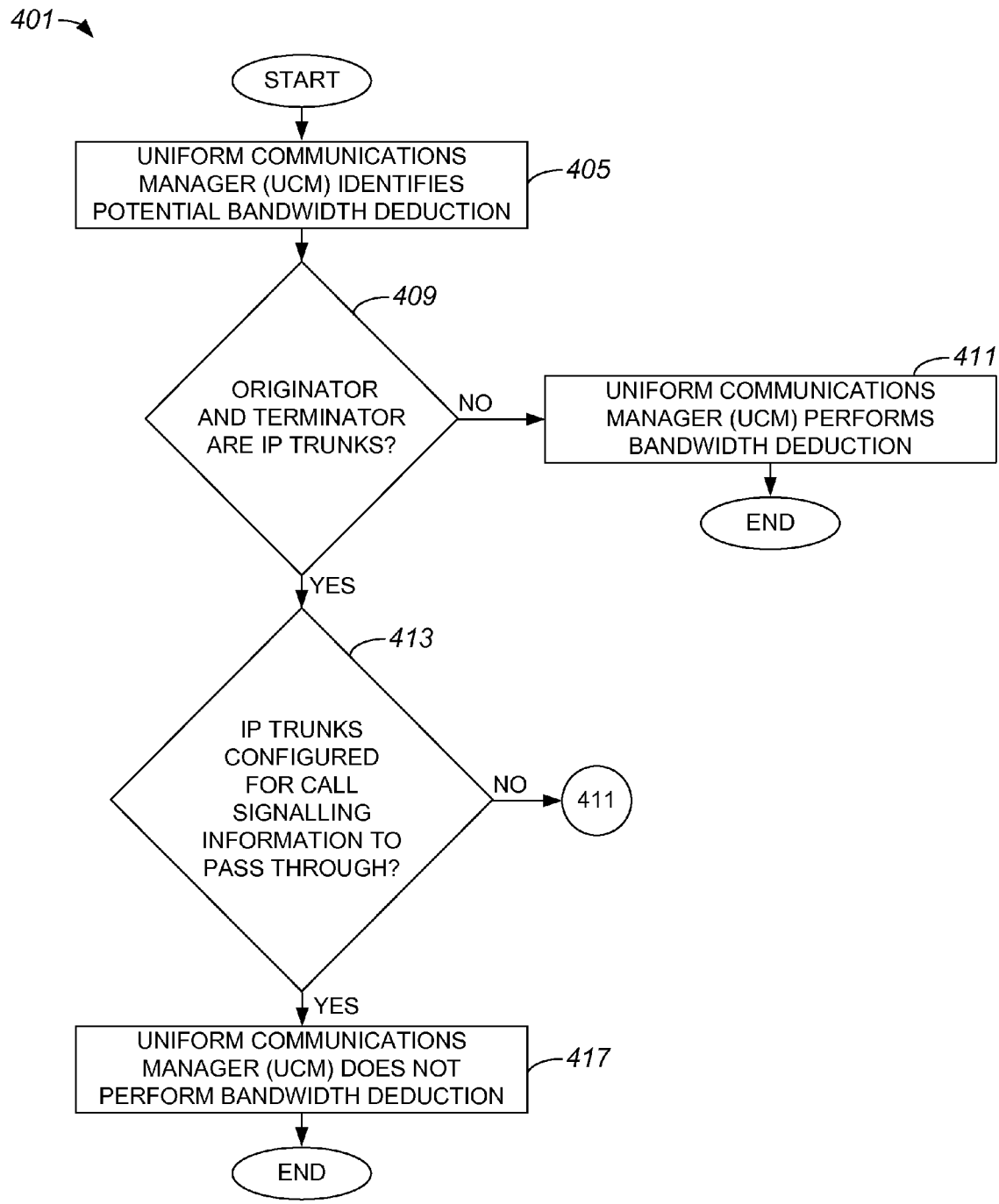
FIG. 4 is a process flow diagram which illustrates a first method of preventing duplicate bandwidth deduction using a Uniform Communications Manager (UCM) in accordance with an embodiment.

Referring next to FIG. 4, one method of preventing duplicate bandwidth deduction using a UCM will be described in accordance with an embodiment. A method 401 of preventing a duplicate bandwidth deduction begins when a UCM, e.g., a UCM that is managing a site or a location, identifies a potential bandwidth deduction. It should be appreciated that a potential duplicate bandwidth deduction may generally be associated with a duplicate reservation. The UCM has an associated location bandwidth manager that enables the UCM to share bandwidth pools.

Upon identifying a potential bandwidth deduction, the UCM may determine in step 409 whether an originator call agent of a communication, e.g., a call, and a terminator call agent of the communication are IP trunks. Such a determination may more generally be associated with determining whether endpoints exist in physical locations or whether the endpoints do not exist within locations, but inherit instead from a location across the far end of associated links. IN one embodiment, an IP trunk may have a physical location such that cases may call across a link and essentially take bandwidth from "intercontinental link" buckets.

If the determination in step 409 is that the originator and the terminator are not both IP trunks, then the indication is that the potential bandwidth deduction is not a duplicate bandwidth deduction. As such, process flow moves from step 409 to step 411 in which the UCM performs a bandwidth deduction. In other words, the UCM performs a bandwidth deduction based on the potential bandwidth deduction that was identified in step 405. After the bandwidth deduction is performed, the method of preventing a duplicate bandwidth deduction is completed.

Returning to step 409, if it is determined that both the originator and the terminator are IP trunks, then process flow proceeds to step 413 in which a determination is made as to whether the IP trunks are configured such that call signaling information passes through the IP trunks. If the determination in step 413 is that the IP trunks are not configured for call signaling information to pass through, then the UCM performs bandwidth deduction in step 411. Alternatively, if it is determined that the IP trunks are configured for call signaling information to pass through, then the UCM does not perform bandwidth deduction in step 417, and the method of preventing a duplicate bandwidth deduction is completed.

In order to accurately perform bandwidth accounting, an originator call agent and a terminator call agent may identify replicated bandwidth deductions, and determine that if a local bandwidth deduction associated with a replicated bandwidth deduction has been accounted for, the replicated bandwidth deduction is to be substantially ignored. When an originator call agent or a terminator call agent is a VCS, a session identifier may be used to identify replicated bandwidth deductions, e.g., replicated bandwidth deductions that are assigned the same session identifier as a local bandwidth deduction may essentially be ignored. As VCS is a Session Initiation Protocol (SIP) proxy, a SIP call-ID may be suitable for use as a session identifier that effectively serves as an end-to-end call identifier. One method which utilizes a session identifier to prevent duplicate bandwidth deduction will be discussed below with respect to FIG. 5.

It should be appreciated that if an end-to-end call path is over a SIP proxy that relies on redirections and a REFER message to accomplish feature operations, then a call ID may serve as an identifier. However, in some cases, a bipartite fate-share ID may be the substantially best way to ensure consistent IDs across feature operations.

When an originator call agent or a terminator call agent is a UCM, as UCM is a back-to-back user agent (B2BUA), a fate-share ID may be used to identify a session such that if the same fate-share ID is associated with a local bandwidth deduction and a replicated bandwidth deduction, the replicated bandwidth deduction may essentially be ignored. Fate-share IDs are generally assembled from half-keys. The originator of a session generates a half-key and the terminator of a session generates a half-key, and the half-keys may be combined to identify a point-to-point session between the originator and the terminator, as described in co-pending U.S. patent application Ser. No. 12/886,388, filed Sep. 20, 2010, entitled "System and Method for Providing a Fate Sharing Identifier in an Network Environment," which is incorporated herein by reference in its entirety for all purposes. Thus, a point-top-point session between an originator and a terminator will have a substantially unique fate-share ID composed of two half-keys.

For a call that traverses multiple call agents, the use of fate-share IDs may be such that substantially all call agents would assemble the same key, i.e., a combination key comprised of two particular half-keys. One method of using fate-share IDs to prevent duplicate bandwidth deduction will be discussed below with respect to FIG. 6.

Figure 5:
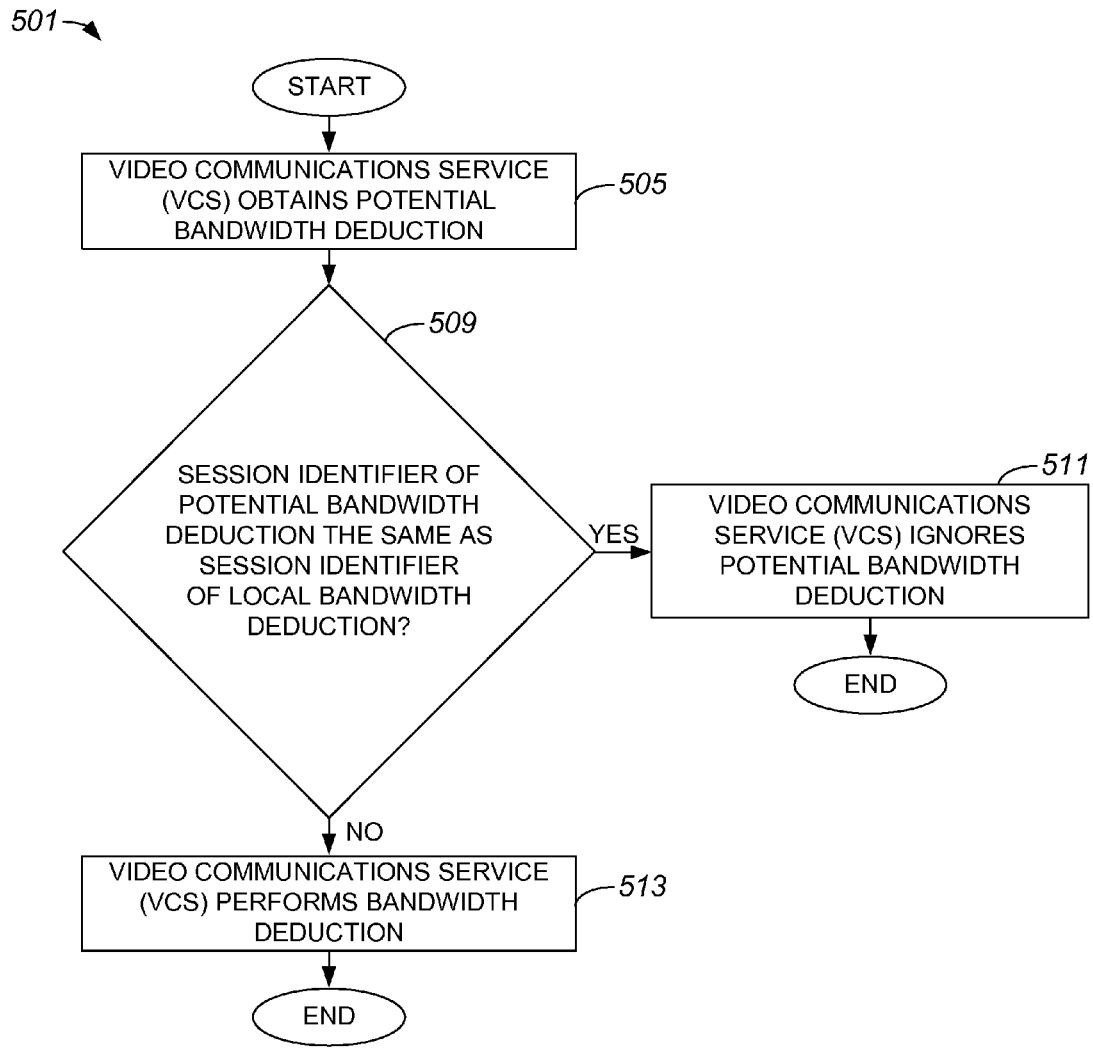
FIG. 5 is a process flow diagram which illustrates a second method of preventing duplicate bandwidth deduction using a Video Communication Service (VCS) in accordance with an embodiment.

FIG. 5 is a process flow diagram which illustrates one method of preventing duplicate bandwidth deduction using a session identifier in an enterprise that includes a VCS in accordance with an embodiment. A method of preventing duplicate bandwidth deduction using a VCS begins in step 505 in which a VCS obtains a potential bandwidth deduction. A determination is made in step 509 as to whether a session identifier of the potential bandwidth deduction is substantially the same as a session identifier of a local bandwidth deduction. If the determination is that a session identifier of the potential bandwidth deduction is substantially the same as the session identifier of a local bandwidth deduction, the indication is that the VCS is not to deduct the potential bandwidth. Accordingly, process flow moves from step 509 to step 511 in which the VCS ignores the potential bandwidth deduction. Upon ignoring the potential bandwidth deduction, the method of preventing duplicate bandwidth deduction is completed.

A fate-share ID may generally be considered to be a bandwidth pooling identifier. It should be appreciated that if two reservations have a sufficiently similar bandwidth pooling identifiers, LBMs may consider the amount to be deducted across shared regions of an end-to-end path to substantially be the largest amount of bandwidth needed for any single call session.

Returning to step 509, if it is determined in step 509 that a session identifier of the potential bandwidth deduction is not the same as a session identifier of a local bandwidth deduction, the implication is that potential bandwidth may be deducted. As such, process flow moves from step 509 to step 513 in which the VCS performs bandwidth deduction. After the VCS performs bandwidth deduction, the method of preventing duplicate bandwidth deduction is completed.

Figure 6:
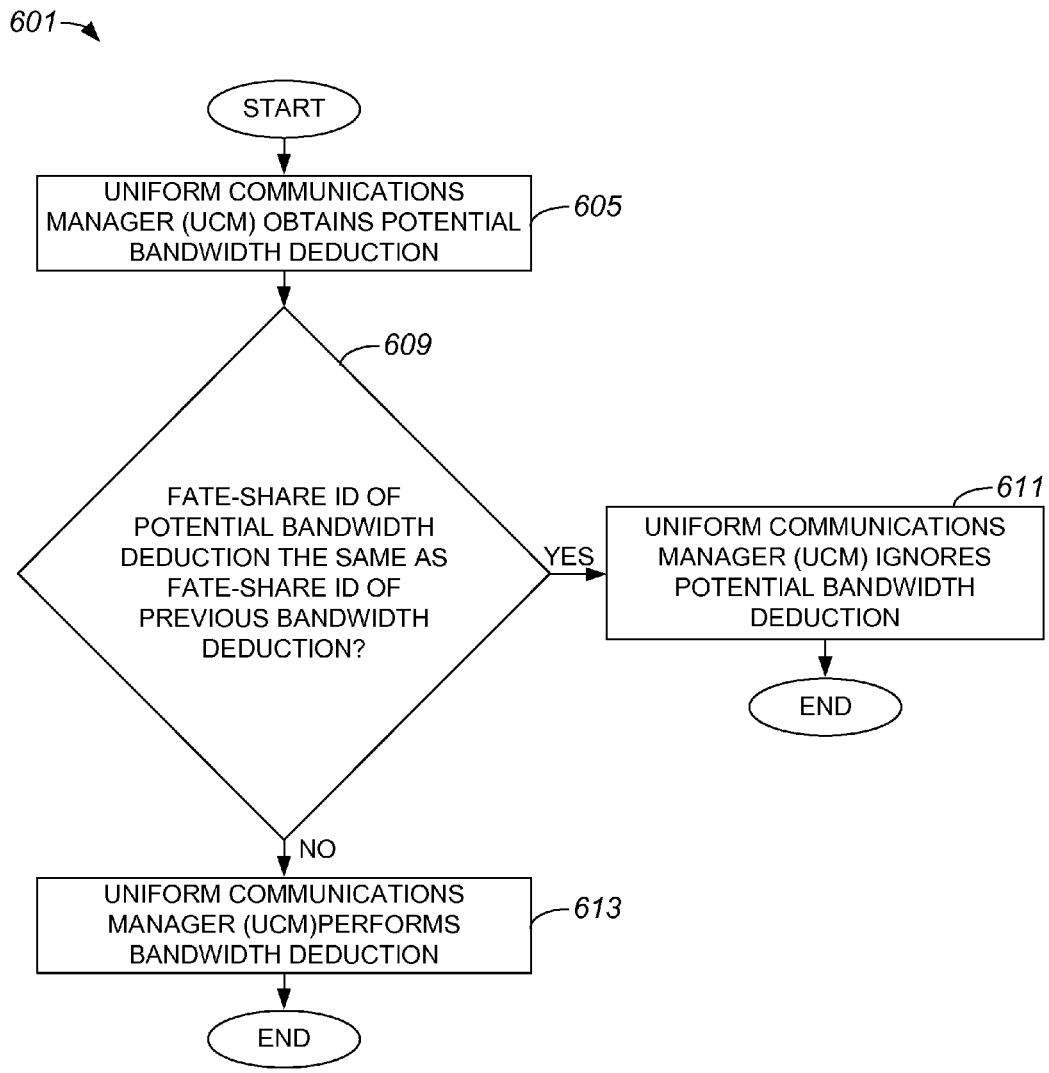
FIG. 6 is a process flow diagram which illustrates a third method of preventing duplicate bandwidth deduction using a UCM in accordance with an embodiment.

With reference to FIG. 6, a method of preventing duplicate bandwidth deduction using fate-share IDs in an enterprise that includes a UCM will be described in accordance with an embodiment. A method 601 of preventing duplicate bandwidth deduction begins at step 605 in which a UCS obtains a potential bandwidth deduction. After the potential bandwidth deduction is obtained, a determination is made in step 609 as to whether a fate-share ID associated with the potential bandwidth deduction is substantially the same as a fate-share ID associated with a previous bandwidth deduction. That is, it is determined in step 609 whether the fate-share ID of the potential bandwidth deduction effectively indicates that the potential bandwidth deduction is a replicated bandwidth deduction.

If it is determined in step 609 that the fate-share ID of the potential bandwidth deduction is substantially the same as the fate-share ID of a previous bandwidth deduction, then in step 611, the UCM ignores the potential bandwidth deduction, and the method of preventing duplicate bandwidth deduction is completed. Alternatively, if it is determined in step 609 that the fate-share ID of the potential bandwidth deduction is not substantially the same as the fate-share ID of a previous bandwidth deduction, the UCM performs bandwidth deduction at step 613. Once the bandwidth deduction is performed, the method of preventing duplicate bandwidth deduction is completed.

As previously mentioned, in order for each call agent within an enterprise to perform bandwidth accounting by preventing duplicate bandwidth deduction, a substantially full picture of a network model may be maintained by each call agent. Maintaining a substantially full picture of a network at each call agent may require duplicate provisioning and, when an enterprise is relatively large, such duplicate provisioning may be inefficient. In one embodiment, rather than each call agent within an enterprise maintaining a substantially full picture of a network model, a call agent may be aware of substantially only parts of the network managed by the call agent and links to immediate neighbors of the call agent.

Each call agent in a network, e.g., a call agent belonging to a replication network for bandwidth transactions, may communicate its local view to other call agents in the network. Once a call agent has obtained local views, e.g., "puzzle pieces," from its neighboring call agents, the call agent may assemble the local views into an overall network model.

Figure 7A:
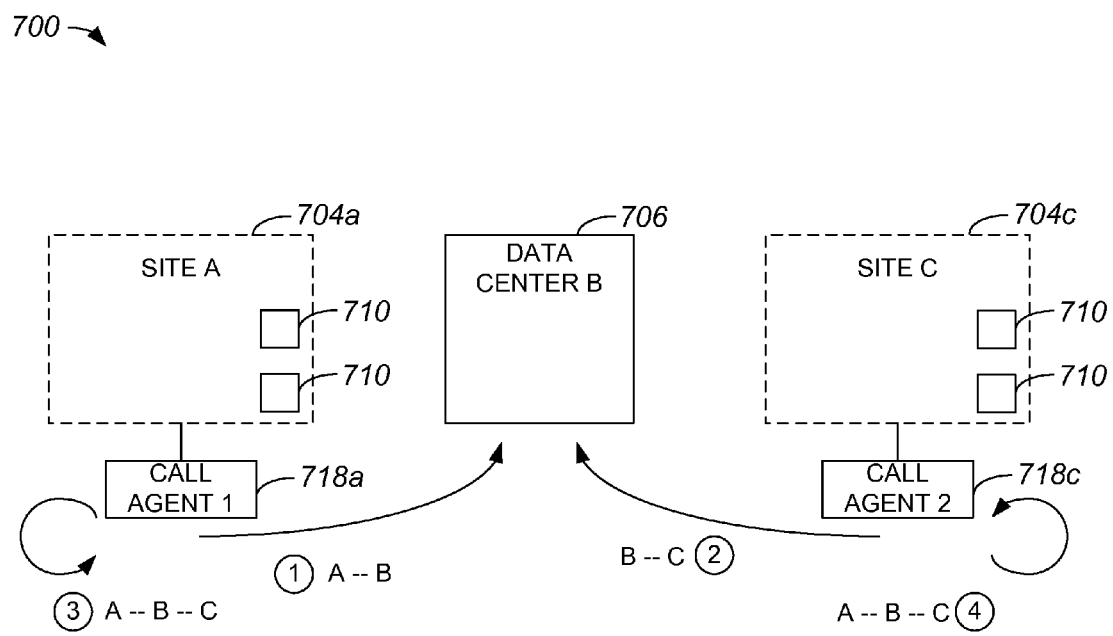
FIG. 7A is a diagrammatic representation of a network in which each call agent is aware of substantially only the parts of the network managed by each call agent and the links to immediate neighbors of each call agent in accordance with an embodiment.

FIG. 7A is a diagrammatic representation of a network in which each call agent is aware of substantially only the parts of the network managed by each call agent and the links to immediate neighbors of each call agent in accordance with an embodiment. A network 700 includes two call agents 718a, 718c and a plurality of locations 704a, 704c, 706. Network 700 may be a replication network associated with an overall enterprise. Call agents 718a, 718c may generally have associated LBMs (not shown). Locations 704a, 704c, 706 include, as shown, sites 704*a*, 704*c* and a data center 706. It should be appreciated that sites 704*a*, 704*c* include endpoints or nodes 710.

In the embodiment as shown, call agent '1' 718*a* is configured to manage site 'A' 704*a*, while call agent '2' 718*c* is configured to manage site 'C' 704*c*. Call agents 718*a*, 718*c* and sites 704*a*, 704*c* are effectively interconnected by data center 'B' 706. It should be appreciated that call agent '1' 718*a*, in addition to managing endpoints 710, e.g., phones, in site 'A' 704*a*, may be aware that there is an egress link (not shown) with a given capacity to data center 'B' 706. Similarly, call agent '2' 718*c* may manage endpoints 710, e.g., phones, in site 'C' 704*c* and be aware that there is a different egress link (not shown) to data center 'B' 706 than the egress link associated with call agent '1' 718*a* to data center 'B' 706.

Call agent '1' 718*a* may replicate a puzzle piece 'A-B' into network 700. Puzzle piece 'A-B' may generally describe site 'A' 704*a* and data center 'B' 706, as well as an edge between site 'A' 704*a* and data center 'B' 706. That is, puzzle piece 'A-B' describes the local view of call agent '1' 718*a*, or the parts of network 700 that are managed by call agent '1' 718*a*, as well as links (not shown) to immediate neighbors of call agent '1' 718*a*. Call agent '2' 718*c* may replicate a puzzle piece 'B-C' into network 700. Puzzle piece 'B-C' may generally describe site 'C' 704C and data center 'B' 706, as well as an edge between site 'C' 704*c* and data center 'B' 706. Puzzle piece 'A-B' and puzzle piece 'B-C' may effectively overlap at data center 'B' 706.

Upon obtaining puzzle piece 'B-C,' call agent '1' 718*a* may assemble a model 'A-B-C.' As such, after communicating its local view of network 700, call agent '1' 718*a* may obtain local views from other call agents, e.g., call agent '2' 718*c*, and effectively assemble an overall network model. Similarly, once call agent '2' 718*c* obtains puzzle piece 'A-B,' call agent '2' 718*c* may assemble a model 'A-B-C.' Each edge and vertex in a model may have bucket values associated therewith.

Figure 7B:
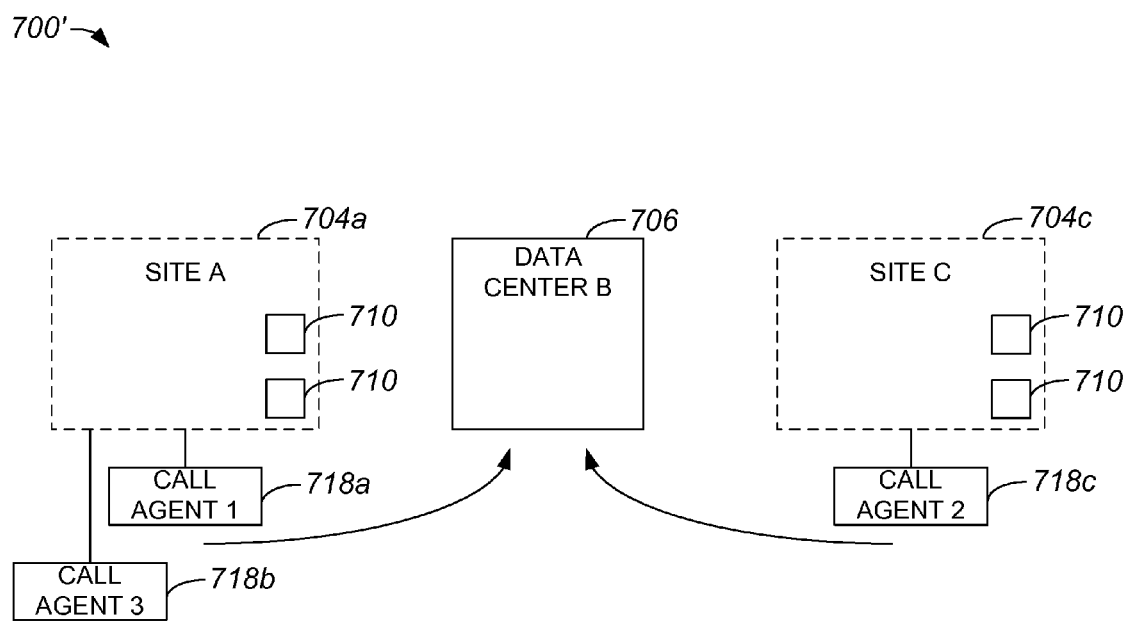
FIG. 7B is a diagrammatic representation of a network, e.g., network 700 of FIG. 7A, in which each call agent is aware of substantially only the parts of the network managed by each call agent and the links to immediate neighbors of each call agent, and more than one call agent manages endpoints at a single site, in accordance with an embodiment.

In some situations, more than one call agent may manage endpoints 710 in the same location and calls associated with the same location. FIG. 7B is a diagrammatic representation of a network, e.g., network 700 of FIG. 7A, in which each call agent is aware of substantially only the parts of the network managed by each call agent and the links to immediate neighbors of each call agent, and more than one call agent manages endpoints at a single site, in accordance with an embodiment. A network 700' includes call agents 718*a*-718*c* and a plurality of locations 704*a*, 704*c*, 706. In the embodiment as shown, call agent '1' 718*a* and call agent '3' 718*b* are configured to manage site 'A' 704*a*, while call agent '2' 718*c* is configured to manage site 'C' 704*c*.

Figure 7C:
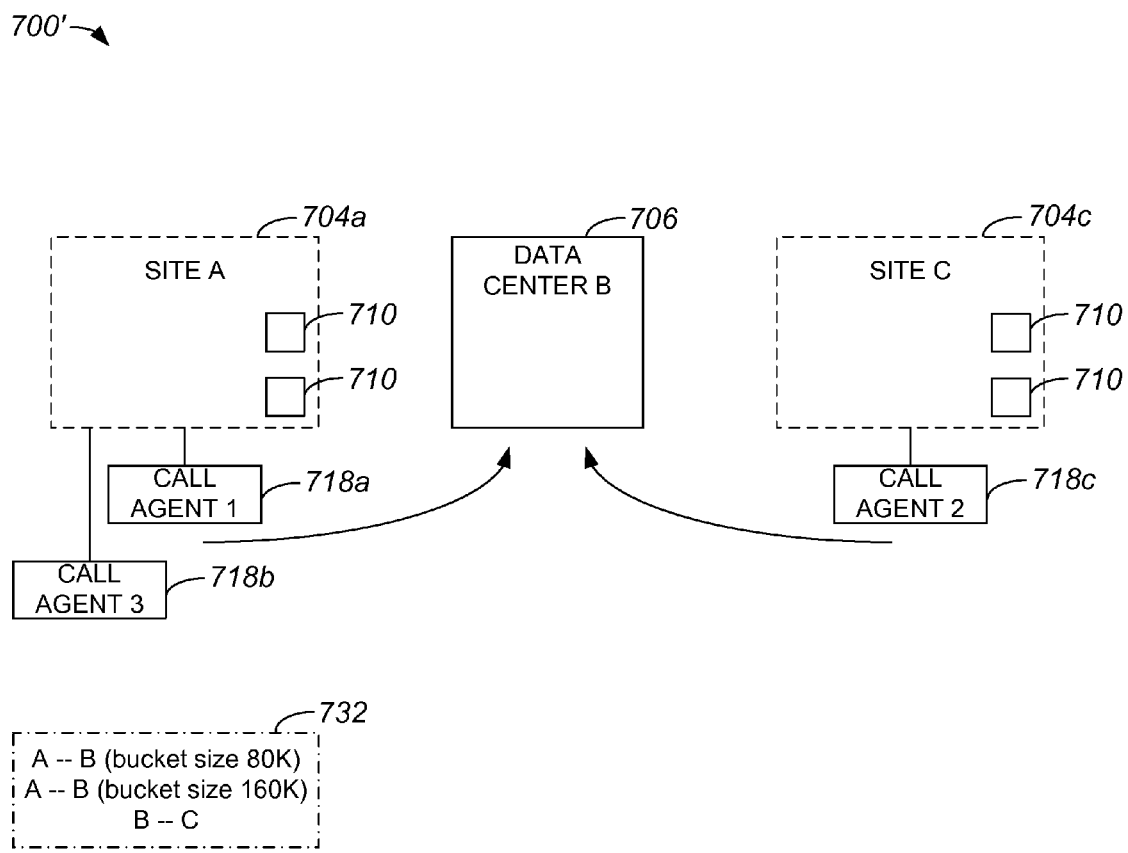
FIG. 7C is a diagrammatic representation of a network, e.g., network 700 of FIG. 7A, as shown with an exemplary graph assembled by a call agent in accordance with an embodiment.

As call agent '1' 718*a* and call agent '3' 718*b* manage endpoints 710 and site 'A' 704*a*, call agent '1' 718*a* and call agent '3' 718*b* may assert bandwidth bucket values associated with site 'A' 704*a* that essentially disagree, e.g., have different values. To effectively reconcile asserted bandwidth bucket values that are different, each call agent 718*a-c* may assemble a network graph that identifies duplicate edges. For example, as shown in FIG. 7C, each call agent 718*a-c* may assemble a network graph 732 that accounts for two 'A-B' puzzle pieces and one 'B-C' puzzle piece. The two 'A-B' puzzle pieces include one puzzle piece with a bandwidth bucket size of approximately 80 K and one puzzle piece with a bandwidth bucket size of approximately 160K. It should be appreciated that bandwidth bucket sizes may vary widely, and the values provided with respect to network graph 732 are examples provided for illustrative purposes.

Duplicate edges between site 'A' 704*a* and data center 'B' 706 are accounted for in a network graph 732. In other words, site 'A' 704*a* and data center 'B' 706 may be connected by two edges having different bandwidth buckets, and network graph 732 is arranged to account for both edges.

Figure 7D:
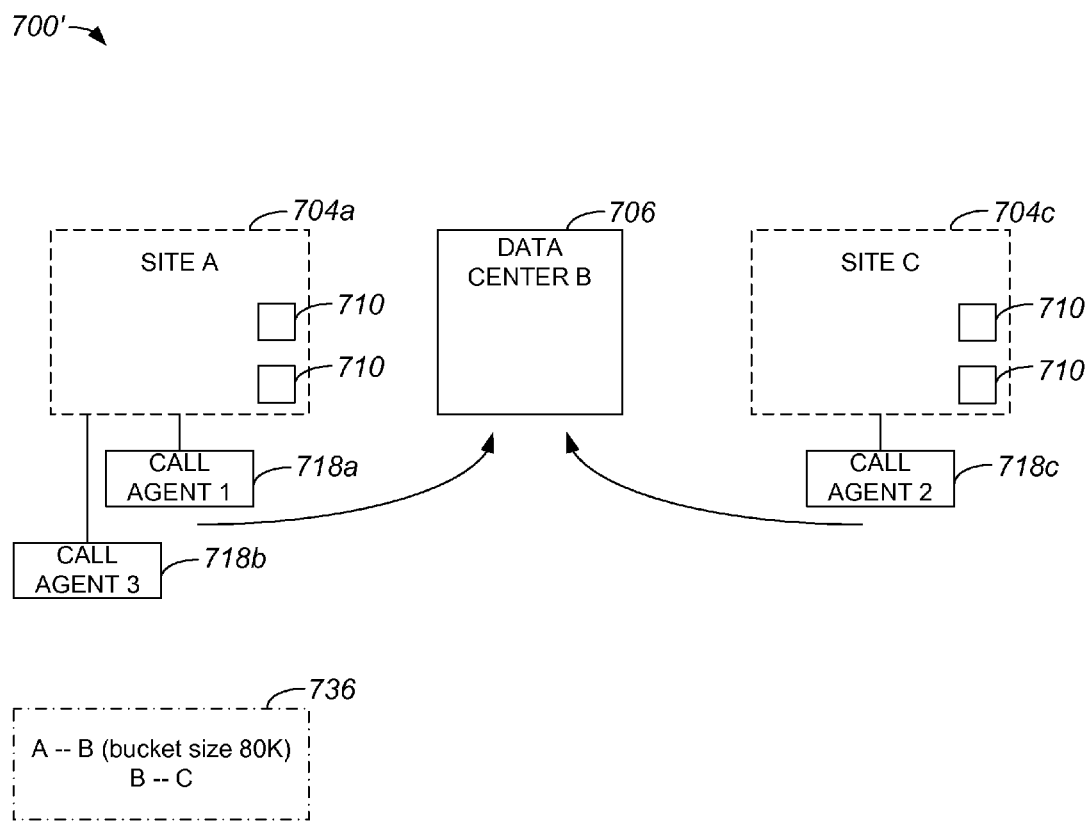
FIG. 7D is a diagrammatic representation of a network, e.g., network 700 of FIG. 7A, as shown with a network model after bandwidth accounting in accordance with an embodiment.

In one embodiment, after network graph 732 is assembled, a reconciliation option may be selected to effectively resolve the different bandwidth buckets associated with the plurality of edges between site 'A' 704*a* and data center 'B' 707. FIG. 7D is a diagrammatic representation of a network, e.g., network 700 of FIG. 7A, as shown with a network model after bandwidth accounting in accordance with an embodiment. A network model 736 is arranged to indicate that an edge between site 'A' 704*a* and data center 'B' 706 has a bucket size of approximately 80 K which, in the described embodiment, is the smallest bandwidth bucket size associated with the plurality of edges between site 'A' 704*a* and data center 'B' 706.

Figure 8:
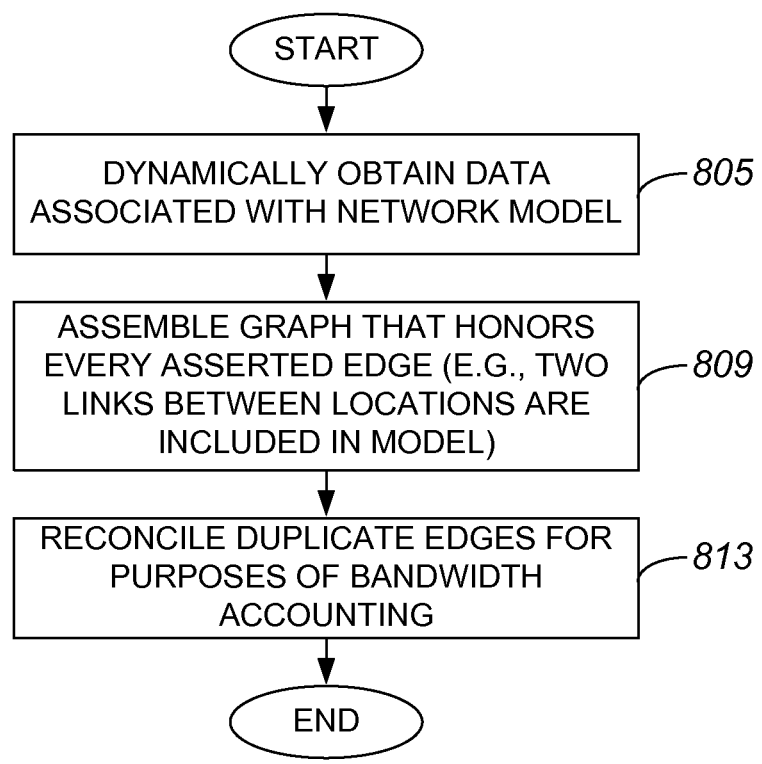
FIG. 8 is a process flow diagram which illustrates a method of topology assembly in accordance with an embodiment.

FIG. 8 is a process flow diagram which illustrates a method of topology assembly in accordance with an embodiment. A method 801 of assembling a topology, or of creating a network model, begins at step 805 in which data associated with a network model is dynamically obtained, e.g., by a call agent. Dynamically obtaining data may include obtaining local views of the network from the point-of-view of call agents in the network.

Once data associated with the network model is obtained, a graph is assembled that honors every asserted edge in step 809. It should be appreciated that as two nodes, e.g., endpoints, may be connected by more than a single edge, each edge between two nodes is shown in the assembled graph. For example, if there are two links between a site and a data center, both links are included in the graph, as the two links may have different bandwidth buckets.

After a graph is assembled, any duplicate edges associated with the graph may be reconciled in step 813. Reconciling duplicate edges is performed for purposes of bandwidth accounting. As duplicate edges may each have different bandwidth bucket sizes, reconciling the duplicate edges allows a call agent to select which bucket size to honor for purposes of bandwidth accounting. By way of example, if one link between a site and a data center has a bucket size of approximately 80 K and a second link between the site and the data center has a bucket size of approximately 160 K, the smaller bucket size of 80 K may be honored for purposes of bandwidth accounting while the larger bucket size of 160 K is noted. It should be understood that when a graph has a plurality of edges that is associated with a discrepancy, both edges may be maintained. During a call admission process, the bandwidth of calls in process may be compared against the edges associated with a discrepancy, and a value may be selected from among conflicting values. When duplicate edges are reconciled, a determination may be made as to the effective bandwidth. In one embodiment, the smallest audio, video, and/or immersive buckets may be chosen, regardless of what edge any given bucket is on, or whether each bucket is configured on the same asserted edge. Upon reconciling duplicate edges, the method of performing topology assembly is completed.

Figure 9:
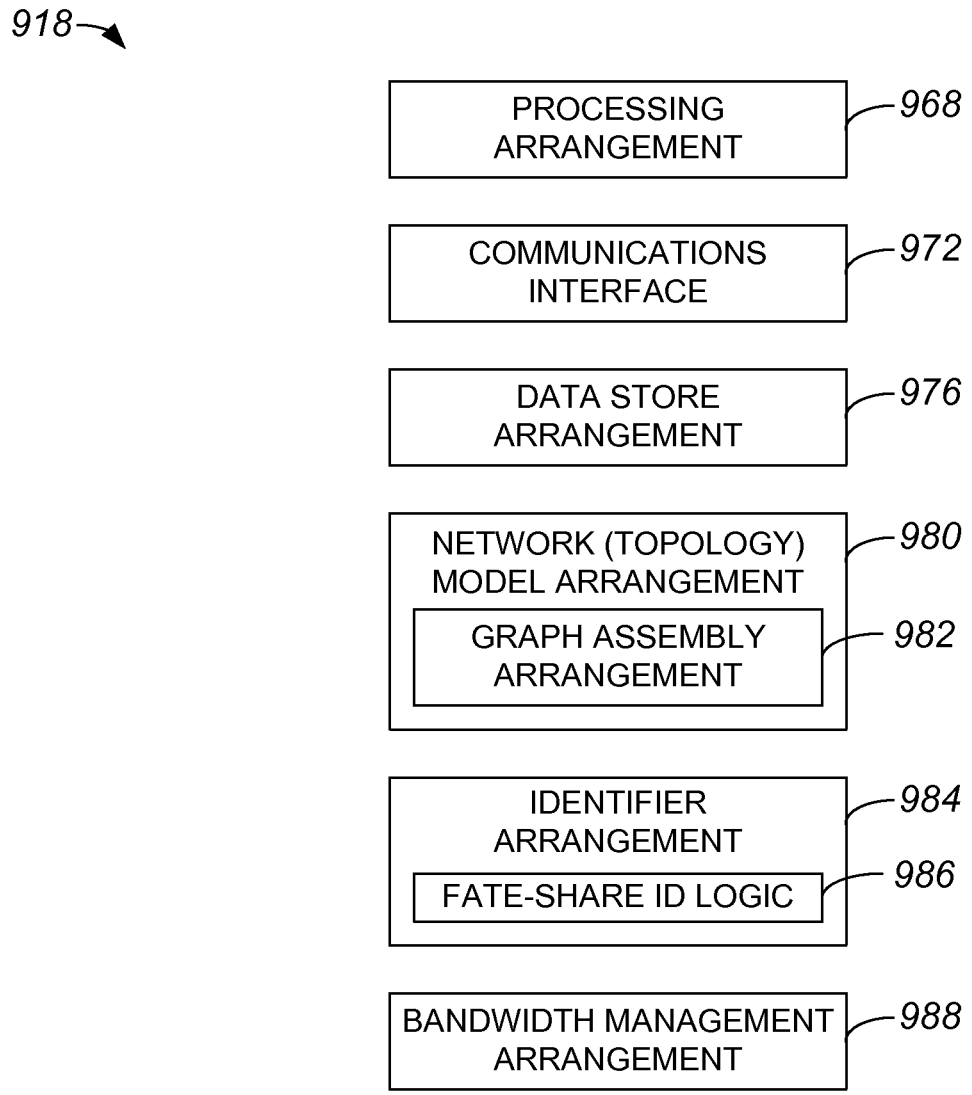
FIG. 9 is a diagrammatic representation of a call agent arrangement in accordance with an embodiment.

In general, a call agent and/or an LBM, e.g., a call agent arrangement, may cooperate within an intercluster CAC system to assemble network graphs and utilize fate-share IDs to identify duplicate bandwidth deduction. FIG. 9 is a diagrammatic representation of a call agent arrangement in accordance with an embodiment. A call agent arrangement 918 that is suitable for use in an enterprise may be a UCM arrangement or a VCS arrangement. In one embodiment, call agent arrangement 918 is a part of a replication network for bandwidth transactions. Call agent arrangement 918 includes a processing arrangement 968 and a communications interface 972. Communications interface 972 is configured to enable call agent arrangement 918 to communicate within a network, as for example with endpoints at a site managed by call agent arrangement 918.

A data store arrangement 976, e.g., a database, may store information obtained and/or utilized by call agent arrangement 918. Such information may include, but is not limited to including, fate-share IDs, network graphs, and information relating to available bandwidth.

A network, or topology, model arrangement 980 is arranged to create at least a local view of a network. In one embodiment, network model arrangement 980 provides its local view of a network to other call agents (not shown), and obtains information from the other call agents pertaining to their local views of the network, e.g., puzzle pieces from other call agents. Using the local view of a network with respect to call agent arrangement 918 and the local views of the network with respect to other call agents, network model arrangement 980 may effectively create an overall network model.

Call agent arrangement 918 also includes an identifier arrangement 984 and a bandwidth management arrangement 988. Identifier arrangement 984 is arranged to identify a session or a call, and includes fate-share ID logic 986 that is arranged to create keys, obtain keys, and to assemble keys into a fate-share ID. Bandwidth management arrangement 988 is arranged to enable bandwidth to be shared between clusters (not shown) and any number of call agents (not shown). In one embodiment, bandwidth management arrangement 988 is configured to deduct bandwidth as appropriate, to replicate bandwidth deductions, and to determine when a duplicate bandwidth deduction has been obtained.

Although only a few embodiments have been described in this disclosure, it should be understood that the disclosure may be embodied in many other specific forms without departing from the spirit or the scope of the present disclosure. By way of example, when a graph is assembled, duplicate edges may effectively be reconciled using a variety of different options. The options may include, but are not limited to including, selecting the smallest bandwidth bucket size and selecting the largest bandwidth bucket size associated with the duplicate edges for purposes of bandwidth accounting.

In general, the use of fate-share IDs has been described as being suitable for use in accounting for bandwidth in an enterprise that includes a VCS, and in accounting for bandwidth in an enterprise that includes a UCM which has a B2BUA. It should be appreciated, however, that the use of fate-share IDs to account for bandwidth may be applied with respect to any suitable enterprise, and is not limited to being used in enterprises that include a VCS and/or a UCM which has a B2BUA.

As described above, a bipartite key such as a fate-share ID may be substantially identical if a deduction is to be considered to be a duplicate deduction. It should be appreciated, however, that deductions may be considered to be identical even if substantially only half a key is common, or approximately the same.

Different edges between two locations have generally been described as having different bandwidth buckets. Different edges, however, are not limited to having different bandwidth buckets. For instance, two links between the same two locations may have the same bandwidth bucket without departing from the spirit or the scope of this disclosure.

When a call spans clusters or call agents, the identity of a caller, a location of a caller, and a session half-key may generally be communicated across an SIP trunk in a call-info header. A called party may use obtained information, in addition to its own identify, location, and session half-key to perform a graph-based CAC against its local account. An intercluster CAC arrangement may replicate a bandwidth deduction to other clusters and call agents, which in turn apply a bandwidth deduction to their respective network models.

In one embodiment, a single centralized view of a network model may be generated using the topology assembly methods described above, and each call agent within a network may consult a substantially centralized account service to access the centralized view of the network. By way of example, one call agent in a network may assemble an overall network model that may then be accessed by other call agents in the network.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals such as signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining a potential bandwidth deduction on a communications interface at a call agent, wherein the call agent is a Unified Communications Manager (UCM), and wherein the call agent includes a processor and the communications interface enables the call agent to communicate on a network, the call agent being associated with an intercluster call admission control (CAC) arrangement in which bandwidth is shared between the call agent and other call agents on the network, the potential bandwidth deduction being associated with a session;
    determining whether the potential bandwidth deduction is a duplicate bandwidth deduction, wherein determining whether the potential bandwidth deduction is the duplicate bandwidth deduction includes identifying an originator of the session, identifying a terminator of the session, determining when the originator and the terminator are both Internet Protocol (IP) trunks, and determining whether the IP trunks are configured for call signaling information to pass through when it is determined that the originator and the terminator are both IP trunks, wherein when it is determined that the IP trunks are configured for the call signaling information to pass through, the potential bandwidth deduction is determined to be the duplicate bandwidth deduction, and wherein when it is determined that the potential bandwidth deduction is the duplicate bandwidth deduction, the indication is that the potential bandwidth deduction has already been accounted for;

deducting the potential bandwidth deduction from a bandwidth bucket when it is determined that the potential bandwidth deduction is not the duplicate bandwidth deduction, wherein the bandwidth bucket is locally associated with the call agent; and ignoring the potential bandwidth deduction when it is determined that the potential bandwidth deduction is the duplicate bandwidth deduction, wherein the potential bandwidth deduction is determined not to be the duplicate bandwidth deduction when it is determined that the originator and the terminator are not both the IP trunks.

2. The method of claim 1 wherein the UCM has a back-to-back-user-agent (B2BUA), and wherein determining whether the potential bandwidth deduction is the duplicate bandwidth deduction further includes:

determining if a first fate-share ID associated with the session is the same as a second fate-share ID of a previous bandwidth deduction, wherein the potential bandwidth deduction is the duplicate bandwidth deduction if the first fate-share ID is the same as the second fate-share ID, and wherein the potential bandwidth deduction is not the duplicate bandwidth deduction if the first fate-share ID is not the same as the second fate-share ID.

3. The method of claim 1 wherein the call agent is one of a plurality of call agents included in the network and the CAC arrangement includes a Location Bandwidth Manager (LBM) that allows the bandwidth to be shared by the plurality of call agents, and wherein the bandwidth bucket is associated with the bandwidth shared by the plurality of call agents.

4. A method comprising:

obtaining a potential bandwidth deduction on a communications interface at a call agent, wherein the call agent is a Unified Communications Manager (UCM), and wherein the call agent includes a processor and the communications interface enables the call agent to communicate on a network, the call agent being associated with an intercluster call admission control (CAC) arrangement in which bandwidth is shared between the call agent and other call agents on the network, the potential bandwidth deduction being associated with a session;

determining whether the potential bandwidth deduction is a duplicate bandwidth deduction, wherein determining whether the potential bandwidth deduction is the duplicate bandwidth deduction includes identifying an originator of the session, identifying a terminator of the session, determining when the originator and the terminator are both Internet Protocol (IP) trunks, and determining whether the IP trunks are configured for call signaling information to pass through when it is determined that the originator and the terminator are both IP trunks, wherein when it is determined that the IP trunks are configured for the call signaling information to pass through, the potential bandwidth deduction is determined to be the duplicate bandwidth deduction, and wherein when it is determined that the potential bandwidth deduction is the duplicate bandwidth deduction, the indication is that the potential bandwidth deduction has already been accounted for;

deducting the potential bandwidth deduction from a bandwidth bucket when it is determined that the potential bandwidth deduction is not the duplicate bandwidth deduction, wherein the bandwidth bucket is locally associated with the call agent; and ignoring the potential bandwidth deduction when it is determined that the potential bandwidth deduction is the duplicate bandwidth deduction, wherein the potential bandwidth deduction is determined not to be the duplicate bandwidth deduction when it is determined that the IP trunks are not configured for the call signaling information to pass through.

5. A method comprising:

obtaining a potential bandwidth deduction on a communications interface at a first call agent, wherein the first call agent includes a processor and the communications interface enables the first call agent to communicate on a replication network, the first call agent being associated with an intercluster call admission control (CAC) arrangement in which bandwidth is shared, the potential bandwidth deduction being associated with a session;

determining whether the potential bandwidth deduction is a duplicate bandwidth deduction, wherein when it is determined that the potential bandwidth deduction is the duplicate bandwidth deduction, the indication is that the potential bandwidth deduction has already been accounted for;

deducting the potential bandwidth deduction from a bandwidth bucket when it is determined that the potential bandwidth deduction is not the duplicate bandwidth deduction, wherein the bandwidth bucket is locally associated with the first call agent;

ignoring the potential bandwidth deduction when it is determined that the potential bandwidth deduction is the duplicate bandwidth deduction; and assembling a local model of the network, wherein assembling the local model of the network includes communicating a first local view of the network, the first local view of the network being a view associated with the first call agent, and obtaining at least a second local view of the network, the at least second local view of the network being obtained from a second call agent included in the replication network, the second local view of the network being a view associated with the second call agent, wherein assembling the local model of the network further includes determining when the local model includes duplicate edges, and reconciling the duplicate edges when it is determined that the local model includes the duplicate edges, wherein reconciling the duplicate edges includes selecting a value for the bandwidth bucket from values associated with the duplicate edges.

6. The method of claim 5 wherein the duplicate edges include a first edge and a second edge, the first edge connecting a first node and a second node of the network, the second edge connecting the first node and the second node, and wherein selecting the value for the bandwidth bucket includes choosing the smallest value associated with the duplicate edges.

7. A tangible, non-transitory computer-readable medium comprising computer program code, the computer program code, when executed by a processor, configured to:
obtain a potential bandwidth deduction at a call agent, the call agent being a Unified Communications Manager (UCM) and associated with an intercluster call admission control (CAC) arrangement in which bandwidth is shared, the potential bandwidth deduction being associated with a session;
determine whether the potential bandwidth deduction is a duplicate bandwidth deduction, wherein when it is determined that the potential bandwidth deduction is the duplicate bandwidth deduction, the indication is that the potential bandwidth deduction has already been accounted for, and wherein the computer program code configured to determine whether the potential bandwidth deduction is the duplicate bandwidth deduction is further configured to identify an originator of the session, identify a terminator of the session, determine when the originator and the terminator are both Internet Protocol (IP) trunks, and determine whether the IP trunks are configured for call signaling information to pass through when it is determined that the originator and the terminator are both IP trunks, wherein when it is determined that the IP trunks are configured for the call signaling information to pass through, the potential bandwidth deduction is determined to be the duplicate bandwidth deduction;
deduct the potential bandwidth deduction from a bandwidth bucket when it is determined that the potential bandwidth deduction is not the duplicate bandwidth deduction, wherein the bandwidth bucket is locally associated with the call agent; and
ignore the potential bandwidth deduction when it is determined that the potential bandwidth deduction is the duplicate bandwidth deduction, wherein the potential bandwidth deduction is determined not to be the duplicate bandwidth deduction when it is determined that the originator and the terminator are not both the IP trunks.

8. The tangible, non-transitory computer-readable medium of claim 7 wherein the UCM has a back-to-back-user-agent (B2BUA), and wherein the computer program code configured to determine whether the potential bandwidth deduction is the duplicate bandwidth deduction is further configured to:
determine if a first fate-share ID associated with the session is approximately the same as a second fate-share ID of a previous bandwidth deduction, wherein the potential bandwidth deduction is the duplicate bandwidth deduction if the first fate-share ID is approximately the same as the second fate-share ID, and wherein the potential bandwidth deduction is not the duplicate bandwidth deduction if the first fate-share ID is not approximately the same as the second fate-share ID.

9. A tangible, non-transitory computer-readable medium comprising computer program code, the computer program code, when executed by a processor, configured to:
obtain a potential bandwidth deduction at a call agent, the call agent being a Unified Communications Manager (UCM) and associated with an intercluster call admission control (CAC) arrangement in which bandwidth is shared, the potential bandwidth deduction being associated with a session;
determine whether the potential bandwidth deduction is a duplicate bandwidth deduction, wherein when it is determined that the potential bandwidth deduction is the duplicate bandwidth deduction, the indication is that the potential bandwidth deduction has already been accounted for, and wherein the computer program code configured to determine whether the potential bandwidth deduction is the duplicate bandwidth deduction is further configured to identify an originator of the session, identify a terminator of the session, determine when the originator and the terminator are both Internet Protocol (IP) trunks, and determine whether the IP trunks are configured for call signaling information to pass through when it is determined that the originator and the terminator are both IP trunks, wherein when it is determined that the IP trunks are configured for the call signaling information to pass through, the potential bandwidth deduction is determined to be the duplicate bandwidth deduction;
deduct the potential bandwidth deduction from a bandwidth bucket when it is determined that the potential bandwidth deduction is not the duplicate bandwidth deduction, wherein the bandwidth bucket is locally associated with the call agent; and
ignore the potential bandwidth deduction when it is determined that the potential bandwidth deduction is the duplicate bandwidth deduction, wherein the potential bandwidth deduction is determined not to be the duplicate bandwidth deduction when it is determined that the IP trunks are not configured for the call signaling information to pass through.

10. A tangible, non-transitory computer-readable medium comprising computer program code, the computer program code, when executed by a processor, configured to:
obtain a potential bandwidth deduction at a first call agent included in a replication network, the first call agent being associated with an intercluster call admission control (CAC) arrangement in which bandwidth is shared, the potential bandwidth deduction being associated with a session;
determine whether the potential bandwidth deduction is a duplicate bandwidth deduction, wherein when it is determined that the potential bandwidth deduction is the duplicate bandwidth deduction, the indication is that the potential bandwidth deduction has already been accounted for;
deduct the potential bandwidth deduction from a bandwidth bucket when it is determined that the potential bandwidth deduction is not the duplicate bandwidth deduction, wherein the bandwidth bucket is locally associated with the first call agent;
ignore the potential bandwidth deduction when it is determined that the potential bandwidth deduction is the duplicate bandwidth deduction; and
assemble a local model of the network, wherein the computer program code configured to assemble the local model of the network is further configured to communicate a first local view of the network, the first local view of the network being a view associated with the first call agent, and wherein the computer program code configured to obtain at least a second local view of the network, the at least second local view of the network being obtained from a second call agent included in the replication network, the second local view of the network being a view associated with the second call agent, wherein the computer program code configured to assemble the local model of the network is further configured to determine when the local model includes duplicate edges, and reconcile the duplicate edges when it is determined that the local model includes the duplicate edges, wherein the computer program code configured to reconcile the duplicate edges is further configured to select a value for the bandwidth bucket from values associated with the duplicate edges.

* * * * *